Figure 1:
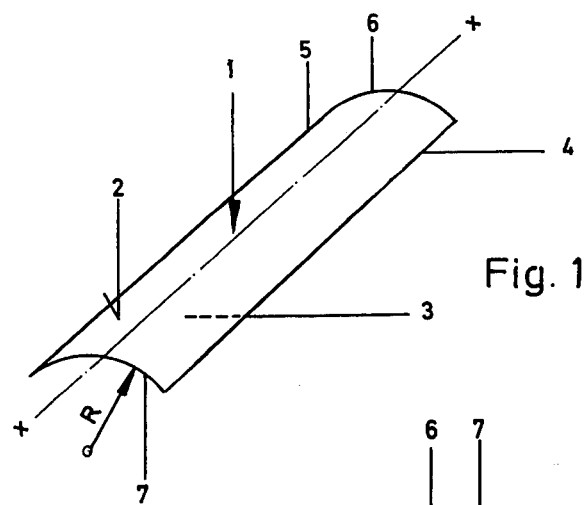

United States Patent [19]

Imme et al.

[11] 4,031,734
[45] June 28, 1977

[54] METHOD FOR THE PRODUCTION OF CONCENTRIC MACHINE ELEMENTS

[75] Inventors: Helmut Imme, Friedberg; Werner Moser, Augsburg, both of Germany

[73] Assignee: SKF Industrial Trading and Development Company B.V., Nieuwegein, Netherlands

[22] Filed: Sept. 9, 1975

[21] Appl. No.: 611,683

Related U.S. Application Data

[62] Division of Ser. No. 524,490, Nov. 18, 1974, Pat. No. 3,950,044.

[30] Foreign Application Priority Data

Dec. 22, 1973    Germany ................... 2364223

[52] U.S. Cl. .................. 72/368; 29/149.5 C; 113/116 UT
[51] Int. Cl.² ........................... B21D 53/10
[58] Field of Search ............ 72/DIG. 19, 368, 379; 52/108; 33/138; 29/149.5 C, 149.5 S; 113/116 UT

[56] References Cited
UNITED STATES PATENTS

| | | | |
|---|---|---|---|
| 2,315,640 | 4/1943 | Morse et al. ................... | 52/108 |
| 2,674,782 | 4/1954 | Surtees .................. | 29/149.5 C |
| 2,905,282 | 9/1959 | Miller ................... | 52/108 |
| 3,073,544 | 1/1963 | Cirves et al. ................... | 33/138 |
| 3,608,844 | 9/1971 | Tumulty et al. ................... | 52/108 |
| 3,774,309 | 11/1973 | Leopoldi ................... | 33/138 |

Primary Examiner—Lowell A. Larson
Attorney, Agent, or Firm—Daniel M. Rosen

[57] ABSTRACT

A method of manufacturing concentric machine elements from flat steel strips by permanently bending a flat steel strip of limited length along its longitudinal axis, and burring the concave surface of the strip, while supported, through the application of a force on the convex surface of the strip, so that a concentrically shaped casing is formed.

2 Claims, 4 Drawing Figures

METHOD FOR THE PRODUCTION OF CONCENTRIC MACHINE ELEMENTS

This is a division of co-pending application Ser. No. 524,490, filed Nov. 18, 1974, and now U.S. Pat. No. 3,950,044.

THE INVENTION

The invention relates to methods of manufacturing and particularly to a method for the production of concentric machine elements such as supports for shafts, axles, etc., from a flat strip of a springy material.

It is known from the German Pat. No. 640 449 that replaceable, semi-cylindrical bearing shells may be used as the support for connecting rods. In the known method a flat strip is bent by hand and inserted in a prefabricated bored hole. This strip then lies against the bored hole under stress. It is a disadvantage however that manual work is required to introduce the bearing shells into the bored hole. Since such work cannot be done by machinery, the range of application of such a method cannot be extended to the building of such bearing shells in series.

It is accordingly the prime object of the present invention to provide a method by which concentric machine elements can be formed out of flat steel strips.

The foregoing object is attained according to the invention by permanently bending a flat steel strip of limited length along its longitudinal axis, and burring the concave surface of the strip, while supported, through the application of a force on the convex surface of the strip, so that a concentrically shaped casing is formed.

Bending the strip along its longitudinal axis with a certain division of stress, after the burring or rolling of the strip, results in transforming the strip into a concentric casing of closed or open shape. Both stress conditions are equivalent. The angle of grip may be either greater or smaller than 360°. This form, bent along the longitudinal axis, has the advantage that strips so formed can be easily stacked. The burring or rolling step can be done by means of mechanical devices so that a concentric casing is formed out of the flat strip, the edges of which can be joined together. According to the radius of curvature of the bent form of the strip that has not yet been rolled, a certain radius of curvature of the concentric casing is created.

In the production of such casings to be suitable for the support of machine elements it is also possible to first form a concentric casing from a strip through rolling. This casing is then burred to a flat strip with a convex-concave shape. The strip in this form can now be stacked, stored and transported to a place for assembly. Here the concentric stress condition is also produced through another burring step so that a bearing casing is produced, ready for assembly.

In a further advantageous embodiment of the invention, the flat strip may be either a springy steel or plastic. In accordance with the invention, the method described herein can be used for all materials which can stand elastic stresses without the danger of cracking.

According to the invention it is of advantage, when using spring steel, to use material which is at least partly coated with plastic.

Figure 2:
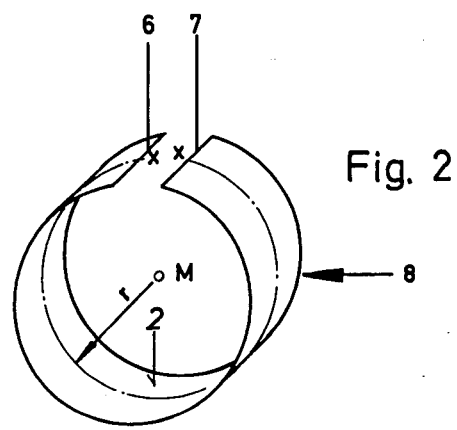
Figure 3:
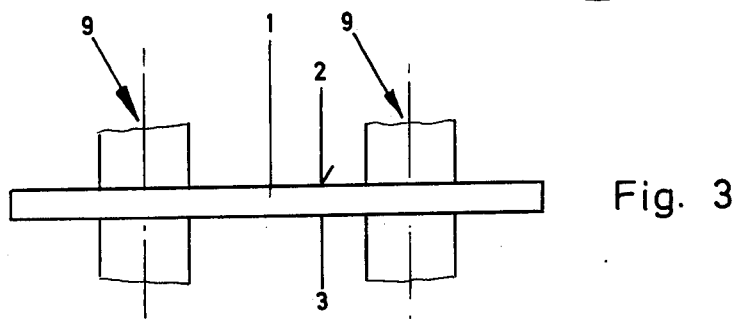
Figure 4:
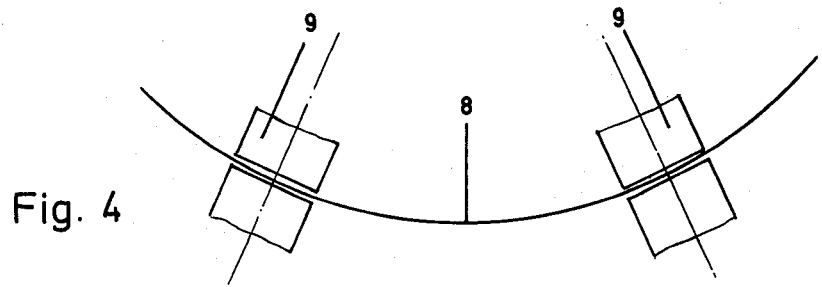

Further advantages, characteristics and other application possibilities of the invention will be evident from the following more detailed description and appended drawings, wherein:

FIG. 1 shows an axonometric view of a flat strip, bent along its longitudinal axis, and which is springy, FIG. 2 illustrates a concentric machine element, FIG. 3 details a flat strip according to FIG. 1 which is clamped for burring, in side view, and FIG. 4 shows a side view according to FIG. 3 of the burring step.

Referring to FIG. 1, a strip 1 is shown which is bent around its longitudinal axis $x-x$. The strip 1 has a convex upper surface 2 and a concave undersurface 3. The longitudinal edges 4, 5 are straight, while side edges 6, 7 follow a curvature radius R.

The strip 1 may be composed of a suitable springy material such as a spring steel band, a plastic, a plastic-coated spring steel band or a plastic into which metal fibers are introduced as reinforcement.

The bent strip 1 can be suitably produced as by the rolling of spring steel material with the radius R.

The curvature R shows that the material is under a certain stress. This stress can only be converted to an equivalent stress by burring or turning up its ends, so that a concentric casing is formed as shown in FIG. 2. Here, the strip, along its longitudinal axis $x-x$, forms a circle or a part of a circle, whereas the side walls 6, 7 are not curved. A concentric machine element has thus been formed around a central point M with the radius r, or at least a practically concentric machine element, which forms a casing 8 or part of a casing 8. This casing 8 can by way of example be introduced to support machine elements in the bore of a housing (not shown). In such a position, it adapts itself to the wall, and its inner surface 2 serves to take up a shaft or axle (not shown).

In FIGS. 3 and 4 the burring or turning up step for the shaping of the casing 8 from the flat strip 1 is shown in side view. The strip 1 is clamped between two pairs of clamping jaws 9 which act on its convex upper surface 2 and its concave lower surface 3. When the pairs of clamping jaws 9 are bent out of their positions as shown in FIG. 3 into that shown in FIG. 4, whereby the center of the curvature lies on the side of the convex upper surface 2, the strip 1 is then burred or turned up and the concentric casing 8 is formed, as shown in FIG. 2.

Other devices can also be used for the burring or rolling step. For instance, the strip 1 can be rolled between two rollers acting as clamping jaws in a manner similar to that shown in FIGS. 3 and 4, so that the casing 8 is formed by bending the strip up under the action of the rollers.

We claim:

1. A method for forming a bearing shell comprising forming a flat strip of elastic material to be permanently bent to have an arcuate cross-section, with a longitudinally extending convex surface on one side and a longitudinally extending concave surface on the other side thereof, and then bending the ends of said permanently bent strip around an axis transverse of the longitudinal axis of said strip and spaced from said first side of said strip to form an arcuate casing that retains its arcuate shape.

2. The method of claim 1 wherein said step of bending comprises applying forces, between the first and second sides of said strip to flatten the transverse cross-sectional shape of said strip, to at least one point while bending the ends of said strip around said transverse axis.